United States Patent
Lai et al.

(10) Patent No.: US 11,353,936 B2
(45) Date of Patent: Jun. 7, 2022

(54) PRIVACY COVERS FOR MOBILE DEVICES

(71) Applicant: HEWLETT-PACKARD DEVELOPMENT COMPANY, L.P., Spring, TX (US)

(72) Inventors: Yi-Ying Lai, Taipei (TW); Chyun Nan Liu, Taipei (TW); Chung Hua Ku, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 394 days.

(21) Appl. No.: 16/479,265

(22) PCT Filed: Jul. 14, 2017

(86) PCT No.: PCT/US2017/042076
§ 371 (c)(1),
(2) Date: Jul. 19, 2019

(87) PCT Pub. No.: WO2019/013810
PCT Pub. Date: Jan. 17, 2019

(65) Prior Publication Data
US 2021/0072803 A1 Mar. 11, 2021

(51) Int. Cl.
*H04N 5/225* (2006.01)
*G06F 21/70* (2013.01)
*G06F 1/18* (2006.01)
*G06F 21/83* (2013.01)
*H04M 1/02* (2006.01)

(52) U.S. Cl.
CPC .............. *G06F 1/182* (2013.01); *G06F 21/83* (2013.01); *H04M 1/0264* (2013.01); *H04N 5/2252* (2013.01); *H04M 2250/52* (2013.01)

(58) Field of Classification Search
CPC .. H04N 5/2251; H04N 5/2252; H04N 5/2254; H04N 5/2257; H04M 1/0264; G06F 21/83–86
USPC ........................................ 348/373, 375, 376
See application file for complete search history.

(56) References Cited

U.S. PATENT DOCUMENTS

| 8,531,832 | B2 | 9/2013 | Wu et al. |
| 9,465,276 | B2* | 10/2016 | Jonsson ................ G06F 1/1656 |
| 2004/0142721 | A1 | 7/2004 | Kim |
| 2011/0058255 | A1* | 3/2011 | Weiss ................... H04N 5/2257 359/511 |

(Continued)

FOREIGN PATENT DOCUMENTS

| CN | 204496352 U | 7/2015 |
| DE | 202011106305 U1 | 1/2012 |

OTHER PUBLICATIONS

Undercover Private iSight Webcam, Jul. 24, 2012, < http://www.vintuitive.com/undercover-private-isight-webcam/>.

*Primary Examiner* — Anthony J Daniels
(74) *Attorney, Agent, or Firm* — Tong, Rea, Bentley & Kim LLC

(57) ABSTRACT

In example implementations, a mobile device is provided. The mobile device includes a camera, a microphone, a metallic housing and a privacy cover. The metallic housing encloses the camera and the microphone. The metallic housing includes a privacy cover storage area. The privacy cover is removably coupled to the privacy cover storage area. The privacy cover is dimensioned to cover the camera and the microphone and stay within a bezel of the metallic housing.

15 Claims, 3 Drawing Sheets

(56) References Cited

U.S. PATENT DOCUMENTS

| | | | |
|---|---|---|---|
| 2014/0119718 A1* | 5/2014 | Oh | G03B 11/041 396/448 |
| 2014/0198439 A1 | 7/2014 | De Pietro et al. | |
| 2015/0059251 A1* | 3/2015 | Rinner | G06F 1/1656 49/465 |
| 2015/0163383 A1 | 6/2015 | Barangan et al. | |
| 2016/0352384 A1* | 12/2016 | Ageishi | H04M 1/185 |
| 2017/0180617 A1* | 6/2017 | Haddad | H04N 5/2257 |
| 2019/0369462 A1* | 12/2019 | Krause | G06F 1/1686 |

* cited by examiner

PRIVACY COVERS FOR MOBILE DEVICES

BACKGROUND

The design of mobile devices has improved over time to include additional functionality. For example, additional peripherals built into the mobile device allow the mobile device to perform additional functions other than basic computing and processing.

Example peripherals include a camera and a microphone. The camera can be used to take pictures, to collect video, to conduct video calls, and the like. The microphone can be used to provide audio input, to record audio, or to provide audio for the video calls, and the like. The camera and microphone help improve the overall user experience of mobile devices.

DETAILED DESCRIPTION

Examples described herein provide a privacy cover for a camera and a microphone of a mobile device. As discussed above, the design of mobile devices has improved over time to include additional functionality. Example peripherals include a camera and a microphone. The camera can be used to take pictures, to collect video, to conduct video calls, and the like. The microphone can be used to provide audio input, to record audio, or to provide audio for the video calls, and the like.

However, the added user experience of the camera and the microphone can come at a cost of reduced security. For example, hackers can gain remote control of the camera and the microphone. With the camera and the microphone compromised, the camera and the microphone can be used to collect personal information, monitor a user without the user's knowledge, and the like.

Examples described herein provide a privacy cover that can be used to prevent the use of the camera and the microphone, even if the camera and the microphone are compromised or hacked. For example, the privacy cover may include a magnetic strip that can cover the camera and the microphone. The mobile device may be designed to include a metallic housing that can attract the magnetic strip for storage while the magnetic strip is not in use. In some examples, the metallic housing may include a recess to allow the magnetic strip to lay flush with the surface of the housing. As a result, the metallic housing may close shut without interference from the magnetic strip.

Figure 1:
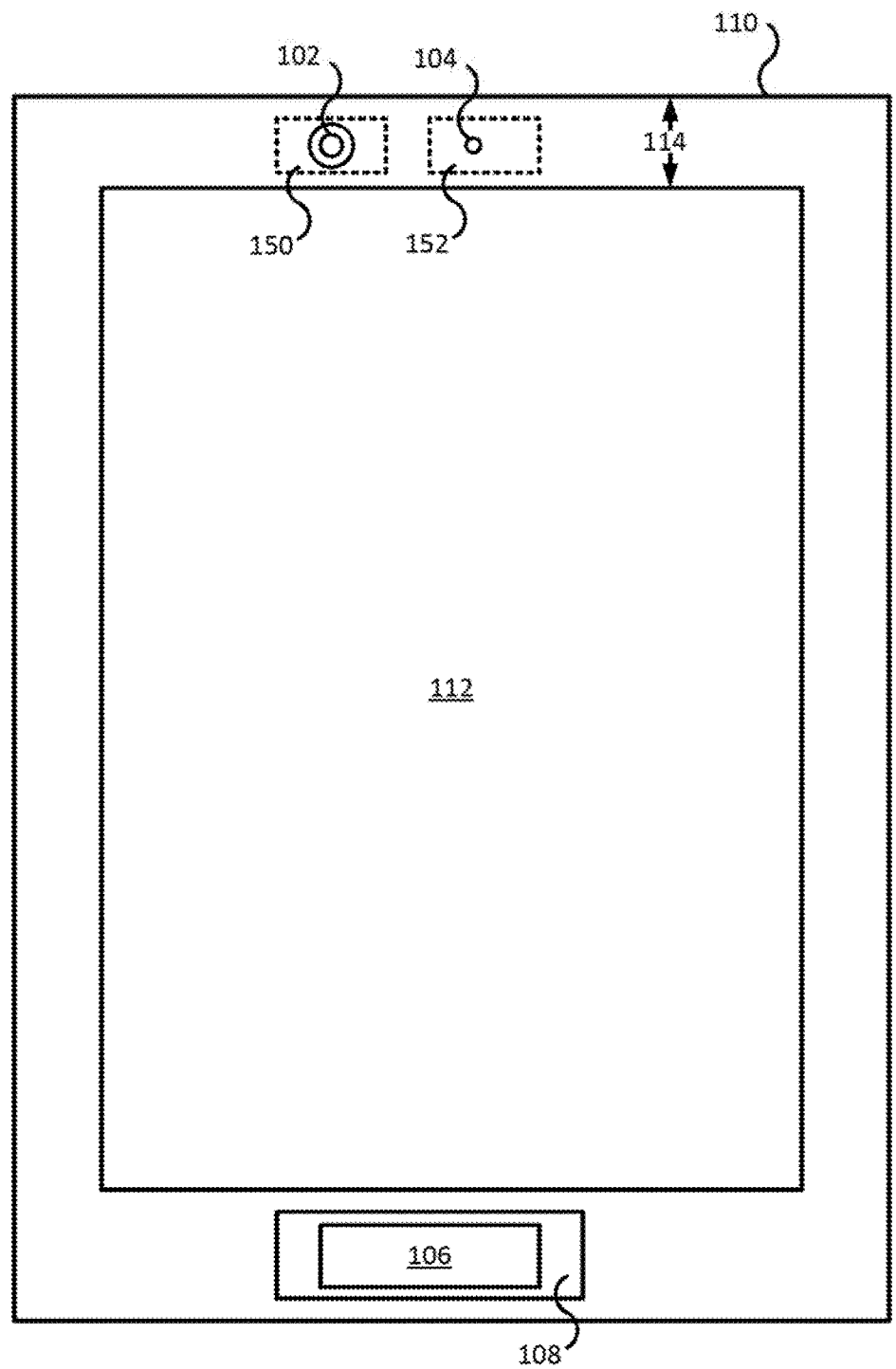
FIG. 1 is a block diagram of an example mobile device with a privacy cover and a privacy cover storage area.

FIG. 1 illustrates a block diagram of a mobile device 100. The mobile device 100 may be a tablet computer, a smart phone, and the like that includes a processor and a computer readable storage medium. In one example, the mobile device 100 may also include a display 112, a camera 150 and a microphone 152 illustrated by phantom lines that are enclosed by a metallic housing 110.

The display 112 may be a touch screen display or a non-touch screen display. The camera 150 may be a red, green, blue (RGB) camera that can be used to capture video images. The microphone 152 may be any type of device that can collect audio signals. The camera 150 may be used to capture images, or may be used in conjunction with the microphone 152 to capture video images, conduct live video communication, and the like.

In one example, the metallic housing 110 may also enclose the display 112. The metallic housing 110 may enclose other components of the mobile device 100 that are not shown, such as for example, the processor, the computer readable storage medium, a graphics processor, wireless network interfaces, and the like.

In one example, the metallic housing 110 may be completely metal (e.g., aluminum, magnesium, a metal alloy, and the like). In another example, the metallic housing 110 may have selective portions that are metallic, while other portions are non-metallic (e.g., plastic).

In one example, the metallic housing 110 may include a first opening 102 that is located over the camera 150 and a second opening 104 that is located over the microphone 152. In one example, the camera 150 and the microphone 152 may be located adjacent to one another along a common side of a bezel 114 of the metallic housing 110.

The metallic housing 110 may include a privacy cover storage area 108 that stores a privacy cover 106. The privacy cover 106 may be removably coupled to the privacy cover storage area 108. For example, the privacy cover 106 may be a magnet or a magnetized metal that is magnetically coupled to the privacy storage area 108. As noted above, the metallic housing 110 may be entirely fabricated from a metal that attracts a magnet, or the privacy cover storage area 108 may be selectively fabricated from a metal that attracts a magnet, while the remaining portions of the metallic housing 110 may be fabricated from other materials.

In one example, the privacy cover 106 may be a single piece of material. The dimensions of the privacy cover 106 may be sized to cover the camera 150 (and the corresponding first opening 102) and the microphone 152 (and the corresponding second opening 104). In addition, the dimensions of the privacy cover 106 may be sized to fit within a width on a side of the bezel 114 where the camera 150 and the microphone 152 are located.

For example, the mobile device 100 may have the camera 150 and the microphone 152 located within 1 inch of each other on a side of the bezel 114 that is approximately 0.5 inches wide. In addition, the diameter of the first opening 102 of the camera 150 may be approximately 0.2 inches and the diameter of the second opening 104 of the microphone 152 may be approximately 0.1 inches. The privacy cover 106 may then have a length that is greater than 1 inch and a width that is less than 0.5 inches, but greater than 0.2 inches to cover both the camera 150 and the microphone 154.

Although the privacy cover 106 is illustrated as having a rectangular shape, it should be noted that the privacy cover 106 may have any type of shape that is dimensioned as described above. For example, the privacy cover 106 may have an oval shape, a square shape, a rectangular shape with rounded corners, an irregular shape (e.g., wavy edges), and the like.

In one example, the side of the bezel 114 where the camera 150 and the microphone 152 are located may also be fabricated with metal. As a result, the privacy cover 106 may be removably coupled to the bezel 114 of the metallic housing 110 to cover the camera 150 and the microphone 152.

In one example, the privacy cover storage area 108 may be formed by a recess in the bezel 114 of the metallic housing 110. The depth of the recess may be equivalent to a thickness of the privacy cover 106.

The recess may allow the privacy cover 106 to rest in the privacy cover storage area 108 without protruding above a surface of the bezel 114. In other words, a top surface of the bezel 114 and a top surface of the privacy cover 106 may be flush when the privacy cover 106 is stored in the recess of the privacy cover storage area 108. As a result, the privacy cover 106 may be stored in the privacy cover storage area 108 more securely without the threat of being pulled out if accidentally brushed against another surface during transportation.

The privacy cover storage area 108 may be located on a side along the bezel 114 that is different than the side along the bezel 114 where the camera 150 and the microphone 152 are located. Although the privacy cover storage area 108 is illustrated in FIG. 1 as being along a bottom side that is opposite the side where the camera 150 and the microphone 152 are located, it should be noted that the privacy cover storage area 108 may also be located along sides of the bezel 114 that are adjacent to the side where the camera 150 and the microphone 152 are located.

Figure 2:
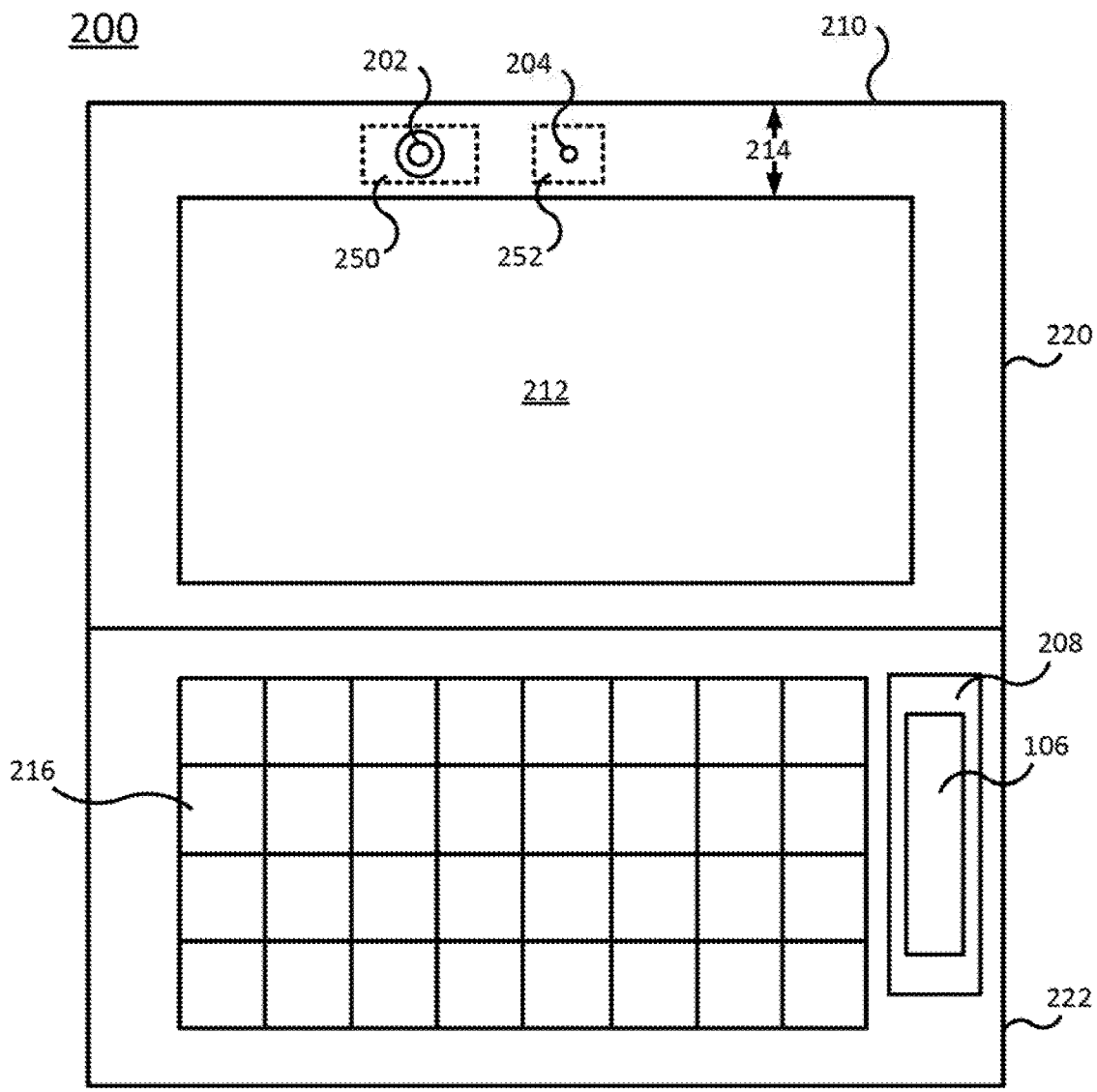
FIG. 2 is a block diagram of another example mobile device with a privacy cover and a privacy cover storage area.

FIG. 2 illustrates a block diagram of a mobile device 200. The mobile device 200 may be a laptop computer, or any other portable device, that has a clamshell design and includes a processor and a computer readable storage medium. In one example, the mobile device 200 may also include a display 212, a camera 250 and a microphone 252 illustrated by phantom lines that are enclosed by a metallic housing 210.

The display 212 may be a touch screen display or a non-touch screen display. The camera 250 may be a red, green, blue (RGB) camera that can be used to capture video images. The microphone 252 may be any type of device that can collect audio signals. The camera 250 may be used to capture images, or may be used in conjunction with the microphone 252 to capture video images, conduct live video communication, and the like.

In one example, the metallic housing 210 may include a first portion 220 and a second portion 222. In one example, the first portion 220 and the second portion 222 of the metallic housing 210 may be completely metal (e.g., aluminum, magnesium, a metal alloy, and the like). In another example, the first portion 220 and the second portion 222 of the metallic housing 210 may have selective portions that are metallic, while other portions are non-metallic (e.g., plastic).

The first portion 220 may enclose a display 212, the camera 250, and the microphone 252. The first portion 220 may enclose other components of the mobile device 200 that are not shown, such as for example, light arrays for the display 212, graphics cards, and the like.

The first portion 220 may include a first opening 202 and a second opening 204. The first opening 202 may be located over the camera 250 and the second opening may be located over the microphone 252. The camera 250 and the microphone 252 may be located adjacent to one another along a common side of a bezel 214 of the first portion 220 of the metallic housing 210.

In one example, the second portion 222 may enclose a keyboard 216 and include a privacy cover storage area 208. The privacy cover storage area 208 may store a privacy cover 106. The second portion 222 may also enclose other components of the mobile device 200 that are not shown, such as for example, the processor, the computer readable storage medium, a wireless network interface, other device interfaces, and the like.

The privacy cover 106 may be removably coupled to the privacy cover storage area 208. For example, the privacy cover 106 may be a magnet or a magnetized metal that is magnetically coupled to the privacy storage area 208. As noted above, the second portion 222 of the metallic housing 210 may be entirely fabricated from a metal that attracts a magnet, or the privacy cover storage area 208 may be selectively fabricated from a metal that attracts a magnet, while the remaining portions of the second portion 222 of the metallic housing 210 may be fabricated from other materials.

In one example, the privacy cover 106 may be a single piece of material. The dimensions of the privacy cover 106 may be sized to cover the camera 250 (and the corresponding first opening 202) and the microphone 252 (and the corresponding second opening 204). In addition, the dimensions of the privacy cover 106 may be sized to fit within a width on a side of the bezel 214 where the camera 250 and the microphone 252 are located.

For example, the mobile device 200 may have the camera 250 and the microphone 252 located within 2 inches of each other on a side of the bezel 214 that is approximately 1 inches wide. In addition, the diameter of the first opening 202 of the camera 250 may be approximately 0.5 inches and the diameter of the second opening 204 of the microphone 252 may be approximately 0.3 inches. The privacy cover 206 may then have a length that is greater than 2 inches and a width that is less than 1 inch, but greater than 0.5 inches to cover both the camera 250 and the microphone 254.

In one example, the side of the bezel 214 where the camera 250 and the microphone 252 are located may also be fabricated with metal. As a result, the privacy cover 106 may be removably coupled to the bezel 214 of the first portion 220 of the metallic housing 210 to cover the camera 250 and the microphone 252.

In one example, the privacy cover storage area 208 may be formed by a recess in the bezel 214 of the second portion 222 of the metallic housing 210. The depth of the recess may be equivalent to a thickness of the privacy cover 106.

Figure 3:
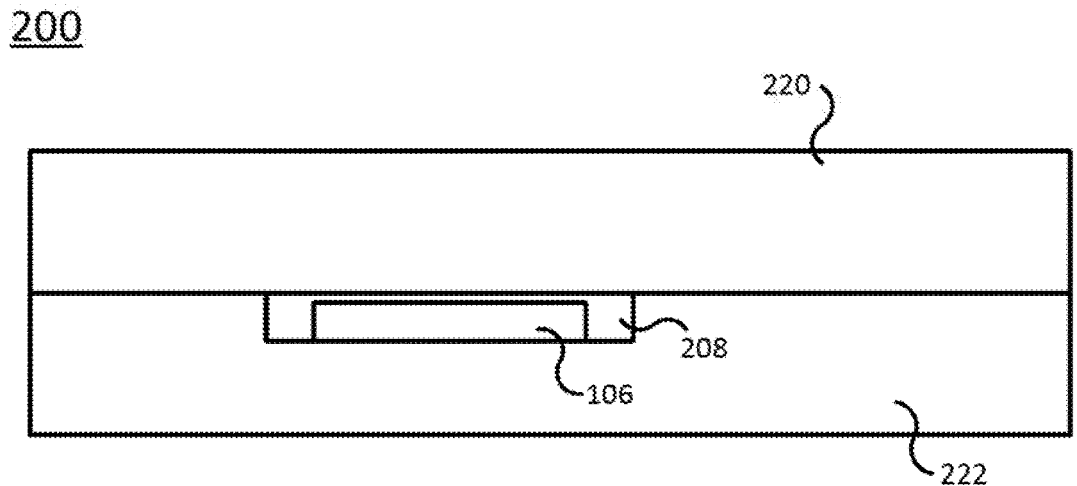
FIG. 3 is a block diagram of a side view of the mobile device with a recessed privacy cover storage area.

FIG. 3 illustrates a side view of the mobile device 200 with the privacy cover storage area 208 that is recessed. For example, the recess may allow the privacy cover 106 to rest in the privacy cover storage area 208 without protruding above a surface of the bezel 214 of the second portion 222. In other words, a top surface of the bezel 214 of the second portion 222 and a top surface of the privacy cover 106 may be flush when the privacy cover 106 is stored in the recess of the privacy cover storage area 208. As a result, the first portion 220 of the metallic housing 210 may be closed completely flat against the second portion 222 of the metallic housing 210.

Referring, back to FIG. 2, although the privacy cover storage area 208 is located on a bottom side of the bezel 214 of the second portion 222, it should be noted that the privacy cover storage area 208 may be located on any side of the bezel 214 of the second portion 222. In other examples, the privacy cover storage area 208 may be located on the first portion 220 on a side that is different than the side along the bezel 214 of the first portion 220 where the camera 250 and the microphone 252 are located.

Figure 4:
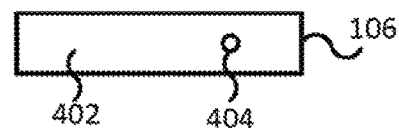
FIG. 4 is a front view of an example privacy cover.

In some examples, the privacy cover 106 may be flat. FIG. 4 illustrates a front view of another example of the privacy cover 106. In some examples, the privacy cover 106 may include camera cover portion 402 and microphone cover portion 404. The camera cover portion 402 may be a portion of the privacy cover 106 that is relatively flat and opaque such that light may not enter through, or images may be distorted, by the camera cover portion 402 of the privacy cover 106.

In one example, the microphone cover portion 404 may be a plug that may be inserted into a second opening 104 or 204 that is located over the microphone 152 or 252, respectively. The plug may have a diameter that is approximately the same as the diameter of the second opening 104 or 204.

In one example, the plug may also be fabricated from the same metallic material as the privacy cover 106. The plug may be molded as a single piece of the privacy cover 106. The plug may be inserted into the second opening 104 and 204 to further provide security and prevent audio from being received by the microphone 152 or 252.

In one example, the plug may be fabricated from a flexible material (e.g., a soft plastic or rubber) that can form an interference fit against the second opening 104 or 204. The interference fit may provide a tighter seal to prevent audio, or sound, from reaching the microphone 152 or 252. The interference fit may provide additional support, in addition to the magnetic coupling, to secure the privacy cover 106 to the bezel 114 or 214.

Figure 5:
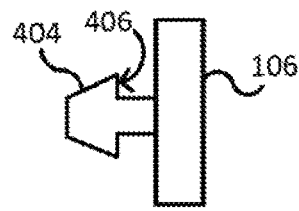
FIG. 5 is a side view of the example privacy cover.

FIG. 5 illustrates a side view of the privacy cover 106 having the plug as the microphone cover portion 404. In one example, the plug may have an arrow head or cylindrical shape. In one example, the arrow head shape may allow the plug to be squeezed into the second opening 104 or 204 and held into place by the wider neck portion 406 of the arrow head shape. Once the plug is inserted into the second opening 104 or 204, the neck portion 406 may catch the inside surface of the second opening 104 or 204 to help secure the privacy cover 106 against the bezel 114 or 214. The plug may be fabricated from a flexible material, as noted above, and pulled out of the second opening 104 or 204 when the privacy cover 106 is removed for storage.

Figure 6:
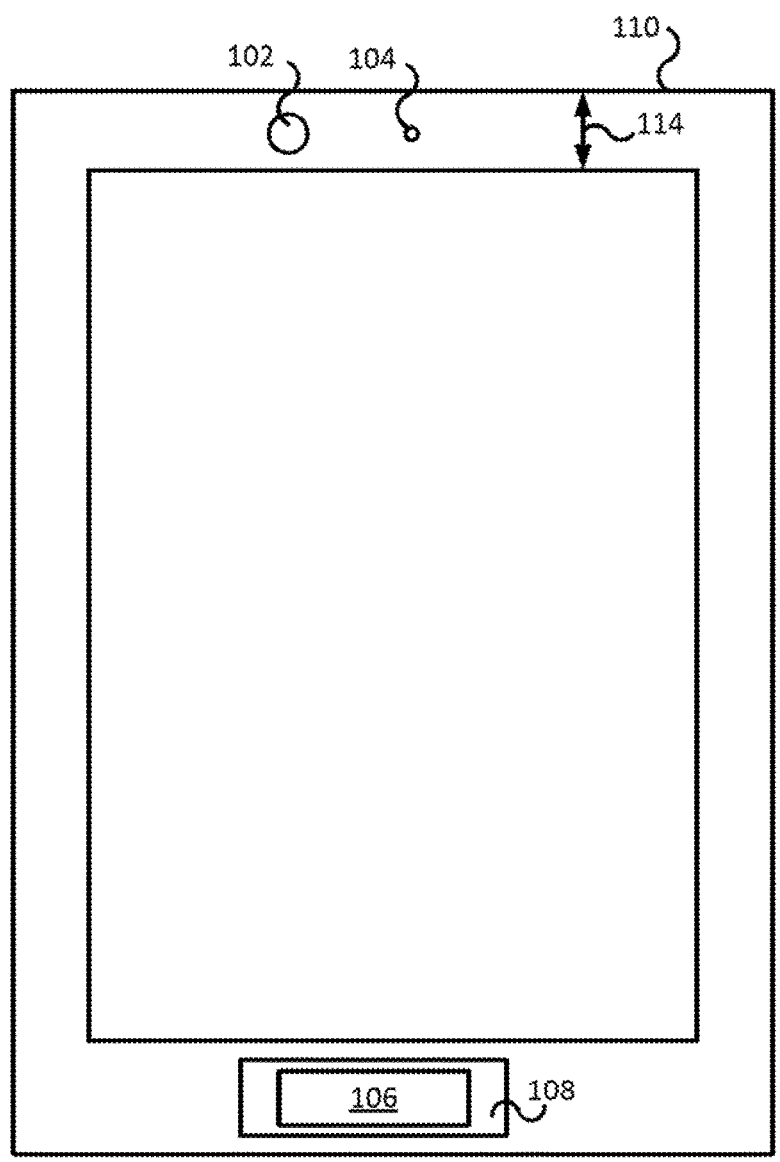
FIG. 6 is a block diagram of an example metallic housing with a privacy cover and a privacy cover storage area.

FIG. 6 illustrates a block diagram of the metallic housing 110 with the privacy storage area 108 and the privacy cover 106. As noted above, the metallic housing 110 may be used as a housing or enclosure for a mobile device. The metallic housing 110 may the first opening 102 for a camera. The first opening 102 may have a diameter that is equivalent to the diameter of a lens of the camera that is deployed in the mobile device. The metallic housing 110 may also have a second opening for a microphone.

The metallic housing 110 may be used for mobile devices that have a front facing camera and microphone. The front facing camera and microphone may be located adjacent to one another along a common side of the bezel 114 of the metallic housing 110. Thus, the first opening 102 and the second opening 104 may also be located on a common side of the bezel 114 of the metallic housing 110. The spacing between the first opening 102 and the second opening 104 may be a function of the spacing between the camera and the microphone that are deployed in a particular mobile device.

The privacy cover storage area 108 may be used to removably store the privacy cover 106. As noted above, the privacy cover 106 may have dimensions to cover the first opening 102 and the second opening 104 and stay within the common side of the bezel 114 of the metallic housing 110.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A mobile device, comprising:
a camera;
a microphone;
a display;
a metallic housing to enclose the camera, the microphone and the display, wherein the metallic housing comprises a privacy cover storage area; and
a privacy cover removably coupled to the privacy cover storage area, wherein the privacy cover comprises dimensions to cover the camera and the microphone and stay within a bezel of the metallic housing.

2. The mobile device of claim 1, wherein the privacy cover comprises a magnetic strip.

3. The mobile device of claim 1, wherein the privacy cover storage area is located on a different side of the metallic housing than the camera and the microphone.

4. The mobile device of claim 3, wherein the privacy cover storage area is located along the bezel of the metallic housing.

5. The mobile device of claim 4, wherein the privacy cover storage area comprises a recess in the bezel of the metallic housing to allow the privacy cover to lay in the recess such that a top surface of the privacy cover and a top surface of the bezel are flush.

6. The mobile device of claim 1, wherein the privacy cover comprises a camera cover portion and a microphone cover portion.

7. The mobile device of claim 6, wherein the microphone cover portion comprises a plug, wherein a diameter of the plug corresponds to a diameter of an opening in the metallic housing that is located over the microphone.

8. A mobile device, comprising:
a display;
a camera;
a microphone;
a keyboard;
a metallic housing, wherein the metallic housing comprises a first portion that encloses the display, the camera, and the microphone and a second portion that encloses the keyboard and comprises a privacy cover storage area, wherein the first portion and the second portion are movably coupled; and
a privacy cover removably coupled to the privacy cover storage area, wherein the privacy cover comprises dimensions to cover the camera and the microphone and stay within a bezel of the metallic housing.

9. The mobile device of claim 8, wherein the privacy cover comprises a magnetic strip.

10. The mobile device of claim 8, wherein the privacy cover storage area is located on a side of the second portion.

11. The mobile device of claim 10, wherein the privacy cover storage area is located along the bezel of the metallic housing.

12. The mobile device of claim 11, wherein the privacy cover storage area comprises a recess in the bezel of the metallic housing to allow the privacy cover to lay in the recess such that a top surface of the privacy cover and a top surface of the bezel are flush.

13. A metallic housing for a mobile device, comprising:
a first opening for a camera;

a second opening for a microphone, wherein the second opening is located on a common side of a bezel of the metallic housing; and a privacy cover storage area to removably store a privacy cover, wherein the privacy cover comprises dimensions to cover the first opening for the camera and the second opening for the microphone and stay within the common side of the bezel of the metallic housing.

14. The metallic housing of claim 13, wherein the privacy cover comprises a camera cover portion and a microphone cover portion.

15. The metallic housing of claim 14, wherein the microphone cover portion comprises a plug, wherein a diameter of the plug corresponds to a diameter of the second opening.

* * * * *